United States Patent [19]

Fujita

[11] 4,419,002
[45] Dec. 6, 1983

[54] LENS EXTENSION AND RETRACTING MECHANISM FOR USE IN A PHOTOGRAPHIC CAMERA OF FOLDING TYPE

[75] Inventor: Susumu Fujita, Kobe, Japan

[73] Assignee: Fuji Photo Film Co., Ltd., Kanagawa, Japan

[21] Appl. No.: 388,303

[22] Filed: Jun. 14, 1982

[30] Foreign Application Priority Data

Jun. 16, 1981 [JP] Japan .................................. 56/93284

[51] Int. Cl.³ .......................................... G03B 17/04
[52] U.S. Cl. ................................................. 354/187
[58] Field of Search ........................ 354/187, 192–194

[56] References Cited

U.S. PATENT DOCUMENTS 2,011,895 8/1935 Goldhammer ..................... 354/187
3,668,992 6/1972 Harvey ............................... 354/187

Primary Examiner—John Gonzales
Attorney, Agent, or Firm—Sughrue, Mion, Zinn, Macpeak and Seas

[57] ABSTRACT

A lens extension and retracting mechanism for use in a photographic camera of a folding type, including a lens board guided between a photographing position at a forward portion of a camera body and an accommodating position within the camera body, sun gears provided on the camera body, planetary arms coaxially rotating with respect to the sun gears, planetary gears provided on the planetary arms so as to be engaged with the sun gears, extension and retracting arms arranged to rotate simultaneously with the planetary gears and pivotally connected to the lens board, and an operating lever. The extension and retracting mechanism is capable of holding the lens board stably and positively.

2 Claims, 9 Drawing Figures

Fig. 1(a)
PRIOR ART
Fig. 1(b)
PRIOR ART
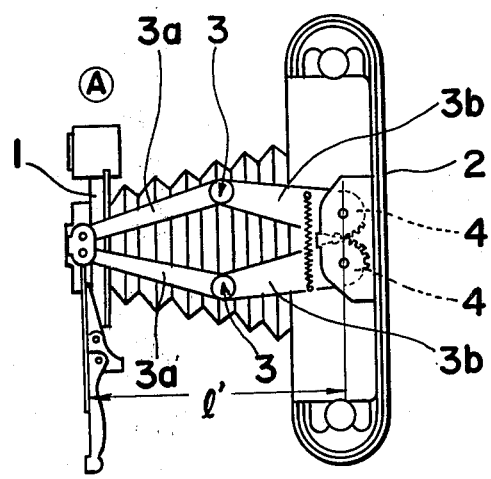
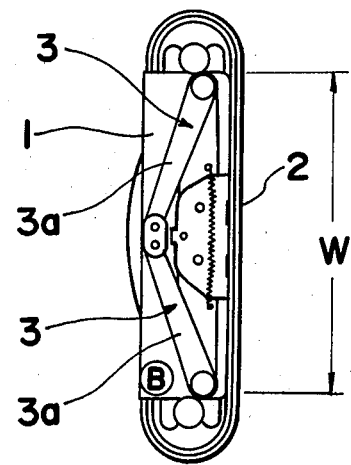

LENS EXTENSION AND RETRACTING MECHANISM FOR USE IN A PHOTOGRAPHIC CAMERA OF FOLDING TYPE

BACKGROUND OF THE INVENTION

This invention generally relates to a photographic camera and more particularly, to a lens extension and retracting mechanism for use in a photographic camera of a folding type.

Conventionally, there have been proposed several lens extension and retracting mechanisms for folding type photographic cameras, for example, as shown in FIGS. 1(a) and 1(b) which are so arranged that a link system 3, 3 guides a lens board 1 for supporting a photographic lens thereon between a photographing position A (FIG. 1(a)) at a forward portion of a body of the camera and an accommodating position B (FIG. 1(b)) inside the camera body for selective extension or retraction of the lens board 1 with respect to the camera body.

In the known lens extension and retracting mechanism as described above, however, since opposite ends of the links 3a, 3a at the side of the lens board 1 have been respectively pivoted to corresponding ends of links 3b, 3b at the side of the camera body, and also to the lens board 1 so that they form a trapezoid link system in the conventional camera of this kind, there is such a disadvantage that accurate positioning is difficult to achieve, thus making it impossible to hold the lens board 1 stably and positively.

Moreover, this has been such a problem that particularly in the case where it is necessary to increase the amount of extension of the lens board 1 in a large-sized camera and the like, the length l' of each of the links 3 must be made long, and therefore, the amount of protrusion W of the links 3 towards opposite sides in the accommodated position in the camera body is undesirably increased, thus necessitating increase in lateral width W of the camera body 2, with a consequent large size to the photographic camera.

Furthermore, in the conventional arrangement as described so far, there is another disadvantage that, since rotative directions of the links 3b, 3b substantially agree with the extending direction of the lens board 1 and a component force for extending the lens board 1 forwardly is, at an initial stage of the extension of the lens board 1, a large force is required for operating a lever for said extension.

SUMMARY OF THE INVENTION

Therefore, it is an object of the present invention to provide an extension and retracting mechanism for use in a folding type photographic camera which may hold the lens board stably and positively, and in which a lateral width of the camera body is decreased, with amount of protrusion of the links toward opposite sides in the accommodated position in the camera body being reduced, and wherein a lever may be operated for the extension of the lens board by a small force at an initial state of the extension of the lens board.

SUMMARY OF THE INVENTION

According to the present invention, there has been proposed a lens extension and retracting mechanism for use in a photographic camera of folding type, which comprises a lens board having mounted thereon a photographic lens for the photographic camera and arranged to be guided between an extended photographing position at a forward portion of a camera body and a retracted accommodating position within the camera body, a sun gear rotatably provided on said camera body, a planetary arm rotating coaxially with said sun gear, a planetary gear rotatably provided on said planetary arm so as to engage said sun gear, an extension and retracting arm arranged to rotate simultaneously with said planetary gear and being pivotally connected to said lens board, and an operating lever for operating said lens extension and retracting arrangement, said lens board being arranged to be selectively extended into said photographing position or retracted into said accommodating position through said extension and retracting arm, with said planetary gear being subjected to planetary revolution through rotation of said planetary arm of said sun gear by the operation of said operating lever.

BRIEF DESCRIPTION OF THE DRAWINGS

Preferred embodiments of the invention will now be described, with reference to the accompanying drawings, in which:

FIG. 1(a) is a top plan view of a prior art photographic camera provided with a conventional lens extension and retracting mechanism which is held in a photographing position, as already referred to above;

FIG. 1(b) is a view similar to FIG. 1(a), which particularly shows the lens extension and retracting mechanism thereof held in an accommodating position, as already referred to above;

DETAILED DESCRIPTION OF THE INVENTION

Figure 2A:
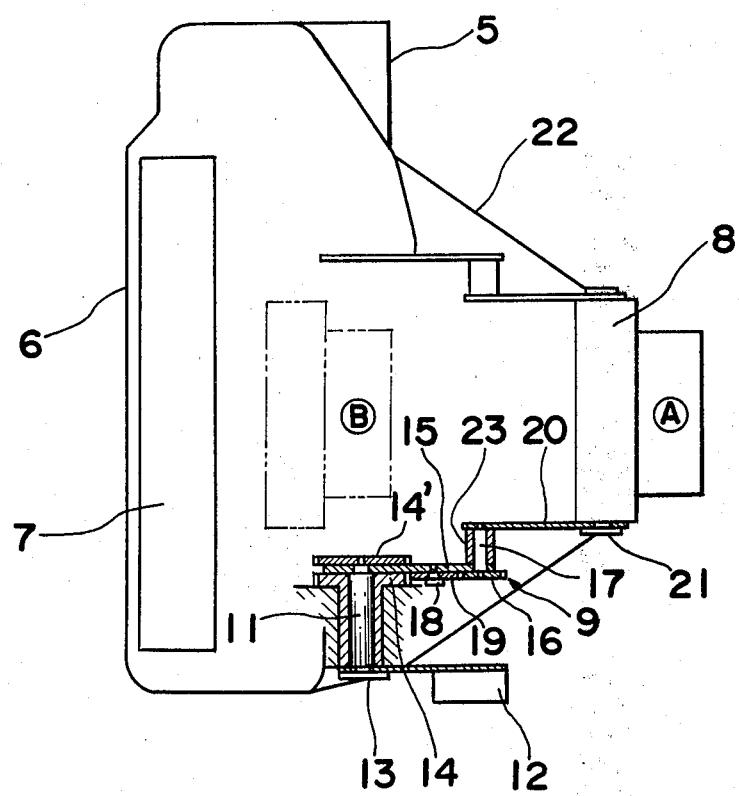
FIG. 2(a) is a schematic side sectional view showing a photographing camera in the photographing position equipped with an improved lens extension and retracting mechanism according to one preferred embodiment of the present invention.
Figure 2B:
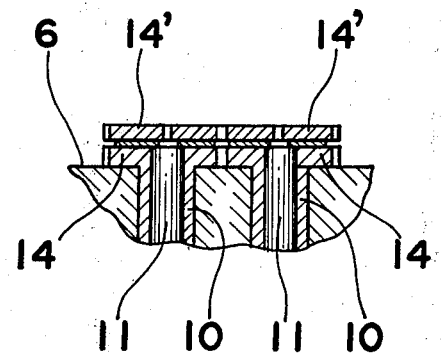
FIG. 2(b) is a cross-sectional view showing, on an enlarged scale, a train of gears employed in the arrangement of FIG. 2(a)

Before the description of the present invention proceeds, it is to be noted that like parts are designated by like reference numerals throughout the accompanying drawings.

Referring to the drawing, there is shown in FIG. 2(a) through FIG. 4, a photographic camera of a folding type to which a lens extension and retracting mechanism according to the present invention is applied.

In FIG. 2(a), the photographic camera generally includes a camera body 5 of a rectangular box-like configuration, a rear cover 6 provided at the back of the camera body 5 for selective opening and closing so as to allow a film cassette 7 to be loaded into or withdrawn from said camera body 5, a lens board 8 mounting a photographic lens and arranged to be guided by the lens extension and retracting mechanism 9 between a solid line photographing position A in front of the camera body 5 and a broken line accommodating position B inside the camera body 5 so as to be extended or retracted as desired, and a bellows 22 fixed, at its opposite ends, to the forward portion of the camera body 5 and the rear portion of the lens board 8 for shielding light so as to be expanded or folded following the extension and retraction of the lens board 8.

The lens extension and retracting mechanism 9 comprises the lens board 8, a pair of sun gears 14, 14 provided on the camera body 5, a pair of planetary arms 15, 15 coaxially rotating with the sun gears 14, 14 respectively, a pair of planetary gears 16, 16 rotatably provided on the planetary arms 15, 15 respectively, a pair of extension and retracting arms 20, 20 arranged to rotate simultaneously with the planetary gears 16, 16 and pivotably connected to the lens board 8, and an operating lever 12.

The pair of sun gears 14, 14 are respectively fixed to upper ends of bearings 10, 10 secured to the forward portion of the camera body 5. Furthermore, interlocking gears 14', 14' and the sun gears 14, 14 separated vertically by planetary arms 15, 15, are respectively calked and fixed to the upper ends of the interlocking shafts 11, 11. The lower end of one of the interlocking shafts 11 is fixed to manual operating lever 12 by a screw 13.

The ends of the pair of planetary arms 15, 15 are respectively fixed to sleeves 23, 23 which are fitted over supporting pins 17, 17. The lower ends of pins 17, 17 are fixed to the pair of planetary gears 16, 16 having a gear ratio of 2:1 with respect to the sun gears 14, 14 which engage the planetary gears 16, 16 through a pair of idle gears 19, 19 respectively, rotatably supported on the planetary arms 15, 15 by calked pins 18, 18.

Upper ends of the supporting pins 17, 17 are respectively fixed to ends of the pair of extension and retracting arms 20, 20. The other ends of the extension and retracting arms 20, 20 are respectively pivotally connected to the lens board 8 by calked pins 21, 21. Accordingly, the pair of extension and retracting arms 20, 20 are arranged to rotate in directions opposite to each other simultaneously with the respective planetary gears 16, 16. Each of the extension and retracting arms 20, 20 has an arm length ratio of 1:1 with respect to the planetary arms 15, 15.

The lens extension and retracting mechanism is symmetrically arranged with respect to a center line of the lens board 8 to support the lens board 8 at the upper, lower, left and right points.

Figure 3:
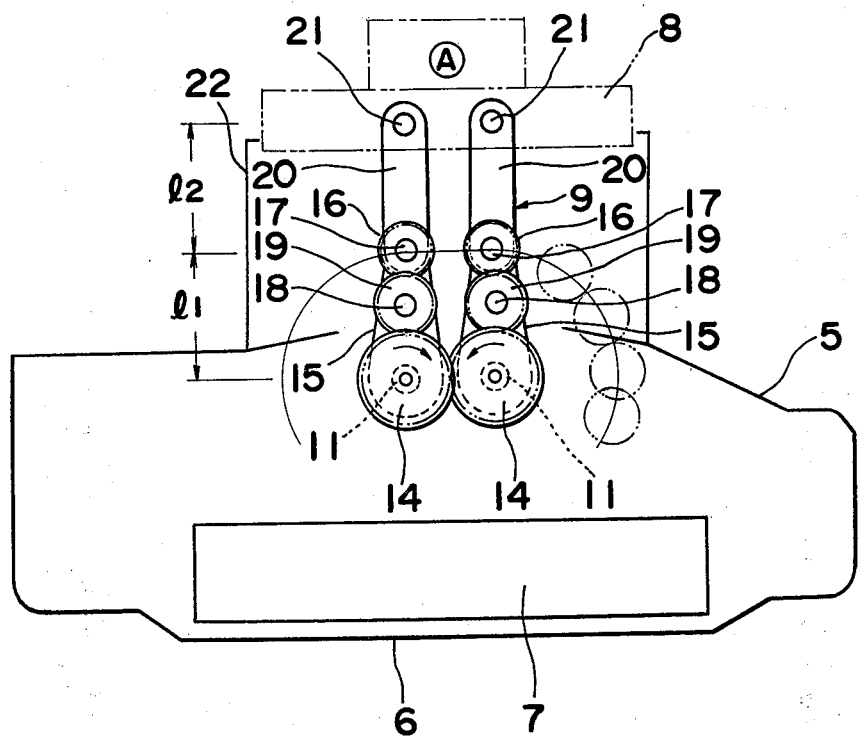
FIG. 3 is a top plan view corresponding to FIG. 2(a)
Figure 4:
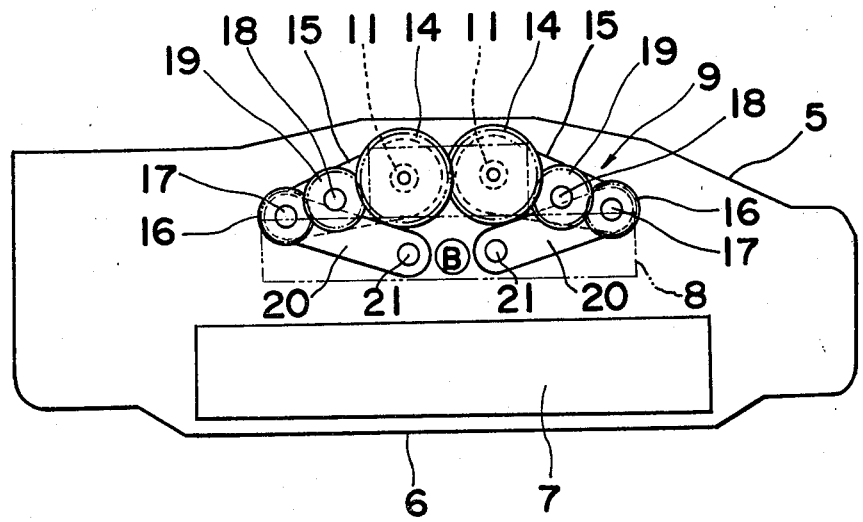
FIG. 4 is a top plan view corresponding to FIG. 2, but with the lens extension and retracting arrangement thereof held in an accommodating position.

Referring to FIG. 3, when the lens board 8 is extended into the photographing position A, the pair of planetary arms 15, 15 and the pair of extension and retracting arms 20, 20 are respectively, in linear alignment. Accordingly, the lens board 8 is stably and positively held in the photographing position A.

When the operating lever 12 is manually operated to retract the lens board 8 into the accommodating position B, the pair of planetary arms 15, 15 are rotated, with respect to the sun gears 14, 14 in direction opposite to each other. Thus, the pair of planetary gears 16, 16 are rotated in directions opposite to each other, since they are rotatably provided on the planetary arms 15, 15 and engaged with the sun gears 14, 14 through idle gears 19, 19, and the pair of extension and retracting arms 20, 20 are rotated in direction opposite to each other, simultaneously with the respective planetary gears 16, 16. Therefore, referring to FIG. 4, the lens board 8 is retracted into the accommodating position B. In this process, after the pair of extension and retracting arms 20, 20 are respectively overlapped a pair of planetary arms 15, 15, the extension and retracting arms 20, 20 are further counter-rotated to retract the lens board 8 in the accommodating position B.

Accordingly, the amount of protrusion of the arms 15, 20 and 15, 20, to opposite sides of the accommodating position B is decreased, and the lateral width of the camera body 5 is decreased.

Figure 5:
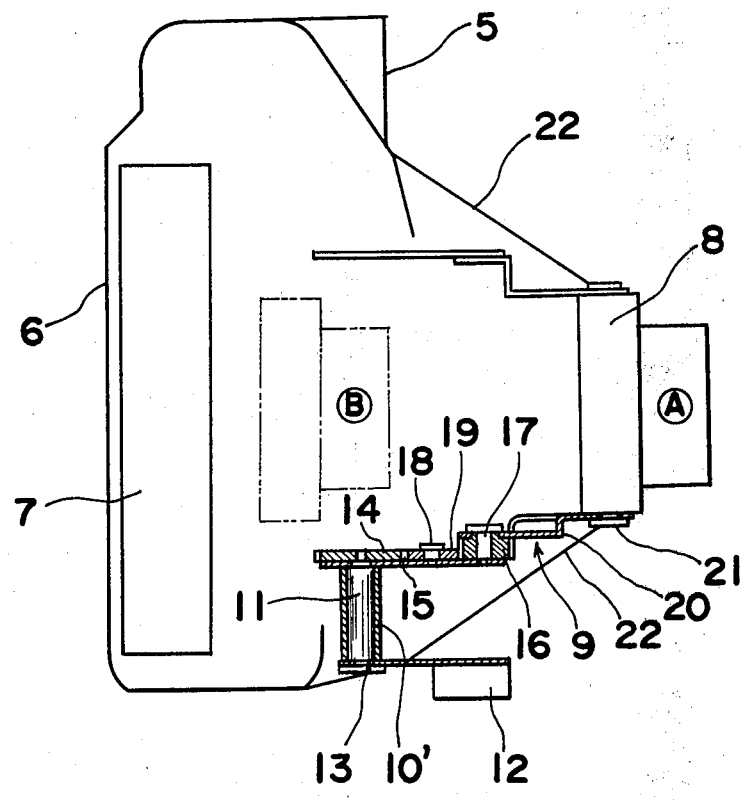
FIG. 5 is a view similar to FIG. 2(a), which particularly shows another embodiment thereof.

Referring to FIG. 5, the other embodiment of the present invention comprises the operating lever 12 fixed to the lower end of the interlocking shaft 11 which is rotatably supported on the fixed bearing 10', by a screw 13, the sun gear 14 fixed to the upper portion of the interlocking shaft 11 by calking and the planetary arm 15 is rotatably fitted to the interlocking shaft 11 in a coaxial relation with respect to the sun gear 14 at the lower side of the sun gear 14.

The embodiment shown in FIG. 5 is similar to that shown in FIG. 2(a) except for the difference discussed above and, therefore, the further details thereof are herein omitted for the sake of brevity, it being, however, to be noted that like parts shown in FIG. 5 are designated by like reference numerals used in FIG. 2(a).

When the operating lever 12 in the above mentioned embodiment is operated to retract the lens board 8 into a dotted line accommodating position B, the right side sun gear 14 is rotated counterclockwise, while the left side sun gear 14 is rotated clockwise, since the right side sun gear 14 is engaged with the left side sun gear 14, and the planetary gears 16, 16 are rotated in directions opposite to each other. Thus, the pair of extension and retracting arms 20, 20 are rotated in directions opposite to each other simultaneously with the respective planetary gears 16, 16.

Figure 6A:
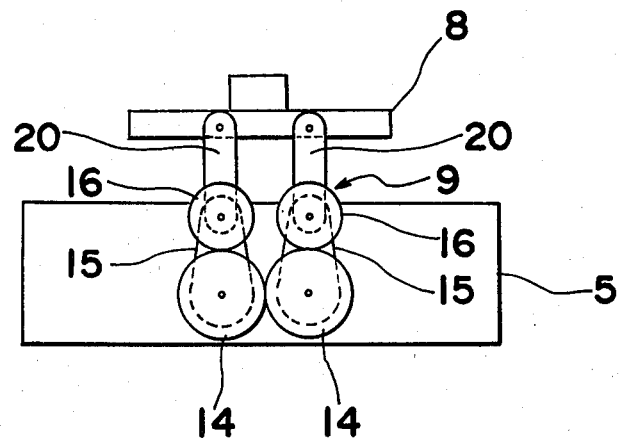
FIG. 6(a) is a fragmentary top plan view showing a lens extension and retracting mechanism according to still another embodiment of the present invention, as held in the photographing position.
Figure 6B:
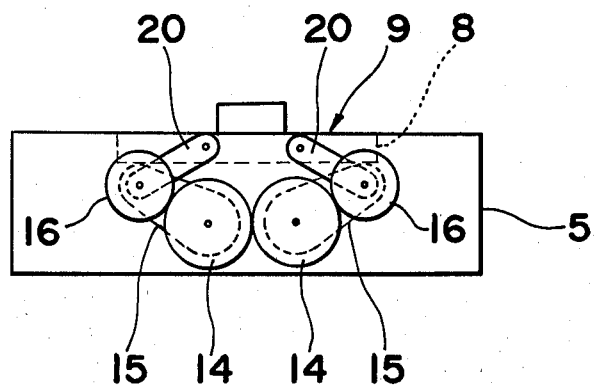
FIG. 6(b) is a view similar to FIG. 6(a), which particularly shows the lens extension and retracting mechanism thereof held in an accommodating position.

Although the respective idle gears 19, 19 in the above mentioned embodiments are arranged between the sun gears 14, 14 and the planetary gears 16, 16, the respective sun gear 14, 14 may be directly engaged with the respective planetary gear 16, 16 as shown in FIGS. 6(a) and 6(b). In this case, the sun gears 14, 14 are preferably arranged in the rear portion of the camera body 5.

Further, although the above mentioned embodiments are provided with a pair of sun gears 14, 14, if the lens board is guided between a photographic position at a forward portion of a body of the camera and accommodating position inside the camera body by a guide means, the lens extension and retracting mechanism may be constituted, for example, by a sun gear, a planetary arm, a planetary gear, an idle gear and an extension and retracting arm on one side of center line of the lens board to operate the lens board by the operating lever.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as included therein.

What is claimed is:

1. A lens extension and retracting mechanism for use in a photographic camera of folding type, which mechanism comprises a lens board member having mounted thereon a photographic lens means for the photographic camera and arranged to be guided between an extended photographing position at a forward portion of a camera body and a retracted accommodating position within the camera body, sun gear means provided on said camera body, planetary arm means coaxially rotating with respect to said sun gear means, planetary gear means rotatably provided on said planetary arm means and engaged with said sun gear means, extension and retracting arm means arranged to rotate simultaneously with said planetary gear means and being pivotally connected to said lens board member, and an operating means for operating said lens extension and retracting arrangement, said lens board member being arranged to be selectively extended into said photographing position or retracted into said accommodating position through said extension and retracting arm means, with said planetary gear means being subjected to planetary revolution through rotation of said planetary arm means of said sun gear means by the operation of said operating means.

2. A lens extension and retracting mechanism for use in a photogrphic camera of a folding type, said mechanism comprising a lens board having mounted thereon a photogrphic lens for the photographic camera and being arranged to be guided between an extended photographing position at a forward portion of a camera body and a retracted accommodating position within the camera body, a pair of sun gears provided on said camera body, a pair of planetary arms coaxially rotating with respect to the respective sun gears in directions opposite to each other, a pair of planetary gears rotatably provided on said planetary arms and each having a gear ratio of 2:1 with respect to said sun gears and respectively engaged with said sun gears through idle gears, a pair of extension and retracting arms arranged to rotate in directions opposite to each other simultaneousely with the respective planetary gears and each having an arm length ratio of 1:1 with respect to said planetary arm and pivotally connected to said lens board, and operating members for operating said lens extension and retracting mechanism, said lens board being arranged to be selectively extended into said photographing position or retracted into said accommodating position through said extension and retracting amrs, with said planetary gears being subjected to planetary revolution through rotation of said planetary arms or said sun gears by the extension of said operating means.

* * * * *